US012625962B2

(12) United States Patent
Avadhanam

(10) Patent No.: US 12,625,962 B2
(45) Date of Patent: May 12, 2026

(54) INSTRUCTION MONITORING FOR DYNAMIC CLOUD WORKLOAD REALLOCATION BASED ON RANSOMWARE ATTACKS

(71) Applicant: Oracle International Corporation, Redwood Shores, CA (US)

(72) Inventor: Phani Bhushan Avadhanam, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 380 days.

(21) Appl. No.: 17/743,945

(22) Filed: May 13, 2022

(65) Prior Publication Data

US 2023/0367878 A1 Nov. 16, 2023

(51) Int. Cl.
*G06F 21/56* (2013.01)
*G06F 21/55* (2013.01)
*G06F 21/57* (2013.01)

(52) U.S. Cl.
CPC .......... *G06F 21/568* (2013.01); *G06F 21/552* (2013.01); *G06F 21/554* (2013.01); *G06F 21/564* (2013.01); *G06F 21/577* (2013.01)

(58) Field of Classification Search
CPC .......... G06F 21/56; G06F 21/52; G06F 21/57; G06F 21/568; G06F 21/552; G06F 21/554; G06F 21/564; G06F 21/577
See application file for complete search history.

(56) References Cited

U.S. PATENT DOCUMENTS

| | | | | |
|---|---|---|---|---|
| 6,832,295 | B1 * | 12/2004 | Stonecypher | ....... G06F 12/1036 711/143 |
| 9,800,760 | B1 * | 10/2017 | Nakahara | ................ H04N 1/642 |
| 11,003,783 | B1 * | 5/2021 | Ursachi | .................. G06F 21/602 |
| 11,392,705 | B1 * | 7/2022 | Wolfe | ................... H04L 9/0897 |
| 12,086,250 | B1 * | 9/2024 | Brandwine | ........... G06F 21/566 |
| 2010/0217836 | A1 * | 8/2010 | Rofougaran | ............ H04M 1/04 709/218 |
| 2011/0078690 | A1 * | 3/2011 | Fahs | ...................... G06F 9/3851 718/102 |
| 2012/0079594 | A1 * | 3/2012 | Jeong | ...................... G06F 21/57 726/23 |
| 2018/0034835 | A1 * | 2/2018 | Iwanir | ................. H04L 63/1416 |
| 2018/0075234 | A1 | 3/2018 | Boutnaru | |
| 2018/0075239 | A1 * | 3/2018 | Boutnaru | ................ G06F 21/60 |

(Continued)

FOREIGN PATENT DOCUMENTS

CN 113221119 A * 8/2021 .......... G06F 21/577

*Primary Examiner* — Catherine Thiaw
*Assistant Examiner* — Daniel Elahian
(74) *Attorney, Agent, or Firm* — Invoke

(57) ABSTRACT

The present embodiments relate to identifying a ransomware attack. One embodiment relates to a method comprising configuring an operating system to collect metrics related to a hardware component. A message can be received from a user space library to validate an instruction detected in a cache, the instruction being associated with the hardware component. A metric can be compared to a threshold metric. The metric can be associated with the hardware component. A likelihood of a ransomware attack can be determined based at least in part on the comparison. A message can be transmitted to the user space library comprising the determination of the likelihood of the ransomware.

27 Claims, 11 Drawing Sheets

(56)　　　　　　References Cited

U.S. PATENT DOCUMENTS

| | | | |
|---|---|---|---|
| 2018/0114020 A1 | 4/2018 | Hirschberg et al. | |
| 2018/0322281 A1* | 11/2018 | Borlick | G06F 21/554 |
| 2018/0349603 A1 | 12/2018 | Yamada et al. | |
| 2019/0042446 A1* | 2/2019 | Sukhomlinov | G06F 12/0897 |
| 2020/0184076 A1* | 6/2020 | McDonough | G06F 21/575 |
| 2021/0182040 A1* | 6/2021 | Jain | G06F 8/4434 |
| 2022/0292194 A1* | 9/2022 | Edwards | G06F 9/485 |

* cited by examiner

500

502 — TRASNSMIT DETECTION INSTRUCTION INTO AN INSTRUCTION DETECTOR

504 — MONITOR CHANGES IN CACHE MEMORY MAPPING

506 — DETECT CHANGED TO MAPPED MEMORY LOCATIONS?

NO

YES

508 — TRANSMIT MESSAGE TO CHECK ASSEMBLY INSTRUCTIONS

510 — RECEIVE INIDCATION OF RANSOMEWARE ATTACK

NO

514

DO NOT REPAVE

YES

512 — REPAVE AFFECTED INSTANCE

INSTRUCTION MONITORING FOR DYNAMIC CLOUD WORKLOAD REALLOCATION BASED ON RANSOMWARE ATTACKS

BACKGROUND

A cloud computing environment includes a combination of a cloud computing infrastructure layer, a cloud platform layer, and an application layer. Each of these layers further includes sub-elements to permit a cloud computing system to deliver services to its customers. Each of these cloud computing layers and elements can provide an opportunity for a bad actor to subvert security measures and harm the functioning of the cloud computing environment.

SUMMARY

The present embodiments relate to dynamic cloud workload reallocation based on an active ransomware attack. A first example embodiment provides a computer-implemented method for dynamic cloud workload reallocation. The method can include configuring an operating system to collect a metric related to a hardware component The computer-implemented method can further include receiving a message from a user space library to validate an instruction detected in a cache, the instruction being associated with the hardware component.

The computer-implemented method can further include comparing the metric to a threshold metric, the metric being associated with the hardware component, based at least in part on the message.

The computer-implemented method can further include determining a likelihood of a ransomware attack based at least in part on the comparison.

The computer-implemented method can further include transmitting a message to the user space library comprising the determination of the likelihood of the ransomware.

A second embodiment related to a cloud infrastructure node. The cloud infrastructure node can include a processor and a non-transitory computer-readable medium. The non-transitory computer-readable medium can include instructions that, when executed by the processor, cause the processor to configure an operating system to collect a metric related to a hardware component.

The instructions can further cause the processor to receive a message from a user space library to validate an instruction detected in a cache, the instruction being associated with the hardware component.

The instructions can further cause the processor to compare the metric to a threshold metric, the metric being associated with the hardware component, based at least in part on the message.

The instructions can further cause the processor to determine a likelihood of a ransomware attack based at least in part on the comparison.

The instructions can further cause the processor to transmit a message to the user space library comprising the determination of the likelihood of the ransomware.

A third embodiment relates to a non-transitory computer-readable medium. The non-transitory computer-readable medium can include stored thereon a sequence of instructions which, when executed by a processor, cause the processor to execute a process. The process can include configuring an operating system to collect a metric related to a hardware component.

The process can further include receiving a message from a user space library to validate an instruction detected in a cache, the instruction being associated with the hardware component.

The process can further include comparing the metric to a threshold metric, the metric being associated with the hardware component, based at least in part on the message.

The process can further include determining a likelihood of a ransomware attack based at least in part on the comparison.

The process can further include transmitting a message to the user space library comprising the determination of the likelihood of the ransomware.

DETAILED DESCRIPTION

Figure 1:
FIG. 1 is a block diagram of an example system for ransomware detection in a cloud infrastructure environment, according to at least one embodiment.
Figure 1:
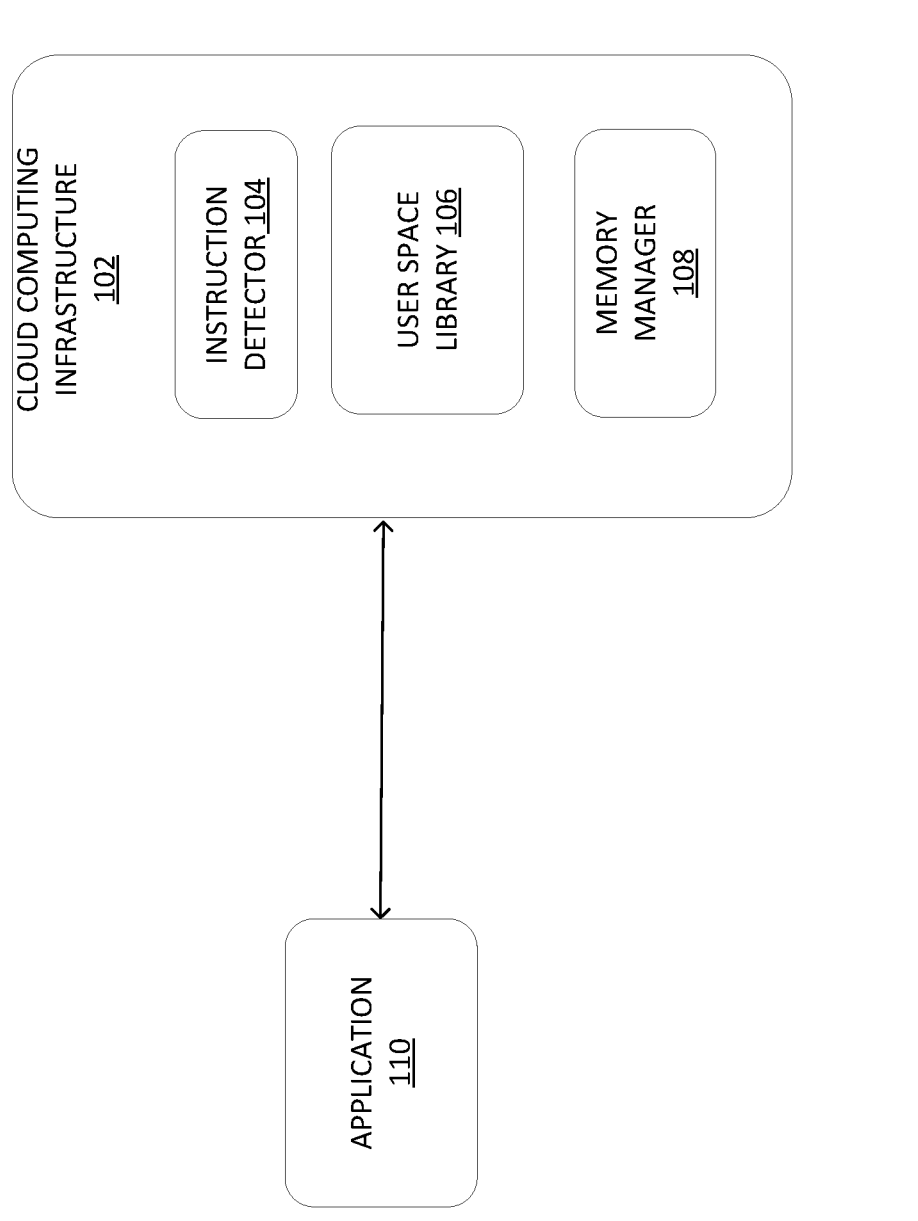

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Many cloud computing systems are vulnerable to active security exploits such as through a ransomware attack. A ransomware attack can include a malicious memory/disk encryption using a secret key. Further, a ransomware attacker can encrypt client data and hold the data for ransom. Failure to provide the ransom can result in the deletion of the client data or inappropriate dissemination of the client data.

Ransomware attacks have evolved to the point that many attacks can bypass standard anti-virus protections. Furthermore, ransomware can be designed to attack specific targets, such as the hardware component of a cloud computing system. Two such ransomware attacks include Full Disk Encryption and Broken Object Level Authorization (BOLA). Laptops and servers are particularly prone to these hardware level ransomware attacks. Once a laptop or a server that is connected to a cloud environment is success- fully attacked by ransomware, the laptop or server become a gateway for a malicious to cause further damage to a cloud system.

Embodiments described herein address the above-refer- enced issues by confronting hardware-level ransomware methods with cloud computing technology. In particular, the embodiments described herein can confront ransomware by connecting an advanced microprocessor instruction set cat- egory to cloud computing technology. In other words, con- necting cloud technology to an instruction set at the hard- ware level. Furthermore, embodiments herein are advantageous over prior methods of confronting ransom- ware by connecting repaving and migration services to address security threats leveled by ransomware.

Embodiments herein can provide a monitoring solution at a low-level processing space whenever a setoff specific microprocessor level instructions are executed. Embodi- ments can further provide a middle-tier set of services and a library of solutions for utility functions. Furthermore, embodiments can provide a glue logic functionality that connects and/or converts memory-mapped monitoring arti- facts in key performance indicators (KPIs) for cloud native scheduler inputs. Embodiments can further permit the alter- ing of algorithms used in the migration of workloads from one set of cloud compute instances to other sets. Further- more, embodiments can allow for the freezing of victim compute instances. The embodiments described herein pro- vide advantageous over previous ransomware confronting methodologies. For example, the embodiments provide con- trol over areas in a cloud computing system that implement the embodiments. Additionally, ransomware can be removed at a microprocessor level.

FIG. 1 is a block diagram illustrating an example system 100 for identification and mitigation of a ransomware attack in a cloud computing infrastructure 102. The system 100 can include an instruction detector 104 for detecting and moni- toring encryption/decryption of assembly instructions at a kernel level. The instruction detector 104 can, for example, detect and monitor the encryption instructions as the instruc- tions are read into an instruction cache from memory or when assembly level instructions are executed. The instruc- tion detector 104 can include low level memory monitoring resources to detect encryption/decryption instructions. The instruction detector 102 can read memory rows to identify any encryption instructions being provided to memory. The encryption/decryption instructions can be aggregated to determine whether a threshold number of changes in memory occur, validating a ransomware attack at the memory.

The system 100 can further include a user space library 106 at a user space in the cloud infrastructure that can initiate the monitoring of low-level memory. The user space library 106 can be a collection of functions that enables communication between an operating system and an appli- cation executing on the operating system. In some embodi- ments, the user space library 106 can be multiplexed across libraries at the platform layer of a cloud environment. The user space library 106 can detect and monitor encryption/ decryption instructions that are being read into an instruction cache. The instruction cache stores the instructions that low-level hardware is going to be executing. In particular, the user space library 106 can monitor the instructions being read into the instruction cache and determine if there are any changes to the instructions. As an illustration, the instruction detector 104 can detect and monitor encryption/decryption routines at a kernel level. While the user space library 106 can detect and monitor encryption/decryption routines at a user space level.

The system 100 can further include a memory translator 108. A memory translator 108 can interact with a memory map to provide cache mapping and un-mapping functions to an application. Each time that an application is introduced into a cloud to a cloud computing instance, the application provides a set of instructions for interacting with the hard- ware. The memory translator 108 can direct the application as to, for example, a placement strategy, and replacement strategy, and a read and write policy for the instructions provided by the application.

The system 100 can interact with an application 110. The application 110 can potentially include ransomware that maliciously encrypts data within the cloud computing infra- structure.

The herein described embodiments offer various function- ality. One function is timer-based polling of an instruction cache. As described above, the user space library 106 can detect and monitor encryption/decryption instructions as they are transmitted to and from the instruction cache. In some embodiments, the system 100 monitors the instruction cache over periodic or aperiodic configurable time intervals. The system 100 can configure the time intervals to decrease or increase. Therefore, if the system 100 determines to increase the length of a time interval to monitor the instruc- tion cache, it can increase a time interval. On the other hand, the user space library 106 can also decrease the length of a time interval.

Another feature of the embodiments described herein is a dynamic random-access memory (DRAM) scan detection threshold for optimization of the herein described detection methodology. The system 100 can scan the DRAM for encryption/decryption validation of assembly instructions. The scan can provide information related to determining when an instruction has been validly encrypted or mali- ciously encrypted. In particular, the scan can further provide information related to determining a weight of the below- described scoring algorithm, and whether the cloud com- puting system is behaving normally or abnormally.

Yet another feature of the embodiments described herein is ability to register and connect a host instance with a repaver. The repaver can be a cloud native repaver, which can be a microservice that is built specifically for a cloud computing environment and periodically updated. The embodiments can further analyze system parameters to determine what level the repaving is performed. For example, repaving can be performed with respect to different system levels, for example, a host level, a container level, a point of delivery (POD) level.

Figure 2:
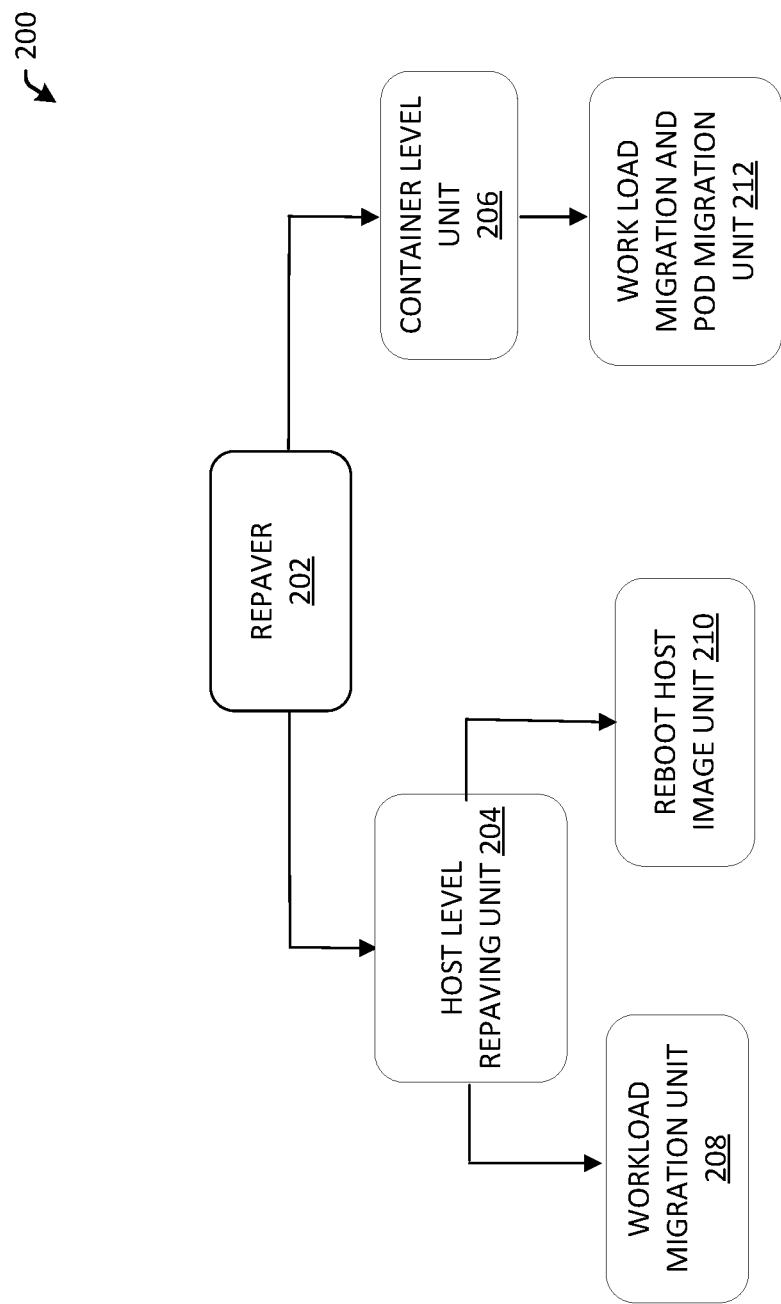
FIG. 2 is a block diagram of an example repaving system, according to at least one embodiment.

Referring to FIG. 2, a repaving system 200 for migrating computing resources (e.g., or workloads) and making requests to perform computing tasks from affected comput- ing instances is shown. Repaving can include restoring a state of an instance to a state prior to the security breach. For example, the repaver 202 can restore a state of workload if ransomware has been introduced to the workload. The repaver 202 can include a host level repaving unit 204 for repaving resources at a host level and a container level repaving unit 206 for repaving resources at a container level. The host level repaving unit 204 can include a workload migration unit 208 for repaving workloads from affected computing instances at a host level. Further, the host level repaving unit 204 can include a reboot host image unit 210 for repaving a host image for the affected computing instances. The container level repaving unit 206 can include a workload migration and pod migration module 212 for repaving workloads from the affected computing instances.

Figure 3:
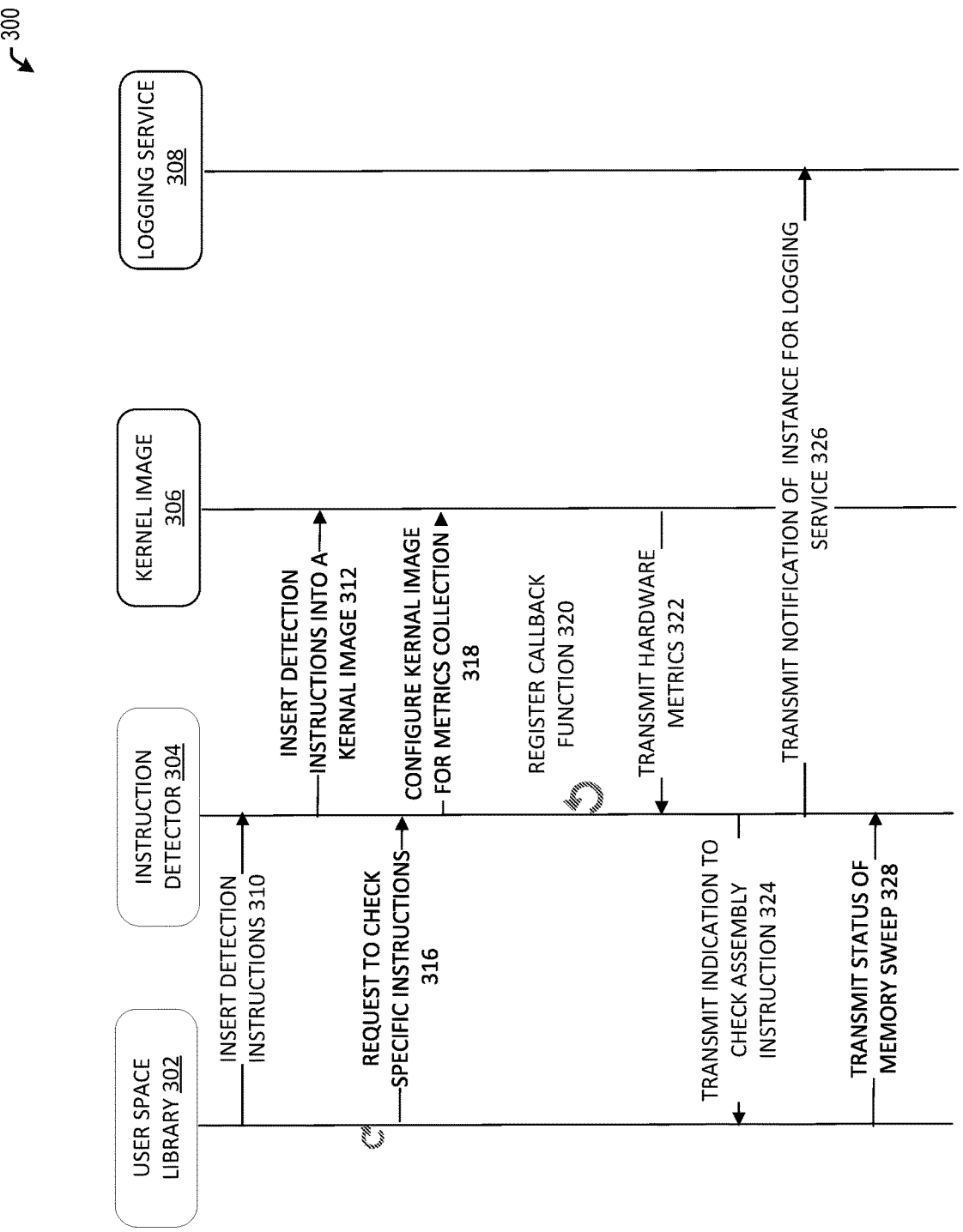
FIG. 3 is a signaling process for an example memory sweeping process, according to at least one embodiment.

Referring to FIG. 3, a signaling diagram 300 for registering/deregistering of encryption assembly instructions monitoring. As illustrated, a user space library 302, an instruction detector 304, and a kernel image 306, and a logging service 308 can interact with each other. While the operations of processes 300, 500, and 600 are described as being performed by generic computers, it should be understood that any suitable device (e.g., a user device, a server device) may be used to perform one or more operations of these processes. Processes 300, 500, and 600 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform functions or implement data types. The order in which the operations are described is not intended to be construed as a limitation, and any number of the described operations can be combined in any order and/or in parallel to implement the processes.

At 310, a user space library 302 can insert a kernel-level detection instructions into an instruction detector 304. The user space library 302 can, for example, include a user space library, and the user space library 302 can retrieve detection instructions for how to detect encrypted/decrypted from a library and insert the detection instructions into the instruction detector 304. The detection instructions can include a kernel driver, which can have the ability to access a kernel application programming interface (API) and memory directly. The user space library 302 can be triggered into retrieving and inserting the detection instructions based on an interaction with an application. The application can be, for example, an application that has potentially been infected with ransomware.

At 312, the instruction detector 304 can insert the detection instructions into a kernel image. In some embodiments, the instruction detector 304 can insert the detection instructions into a kernel tree, which can be a source directory or repository that contains a kernel source. Steps 310 and 312 can result in the insertion of detection instructions at a core processor level.

At 314, the user space library 302 can monitor instructions, such as assembly level instructions, that are being loaded onto or retrieved from a cache, such as an instruction cache. The instruction can be assembly level instructions that are transmitted to the cache based on the application and related to hardware. The user space library 314 can further monitor the assembly instructions for memory map changes. Memory mapping can be a process by which contents of a main memory are brought into a cache, such as the instruction cache. Memory mapping can also include a process by which a block of the main memory is mapped to cache in case of a cache miss. A change in the memory mapping can be indicative of changing a map from retrieving a legitimate instruction from memory, and retrieving an instruction that can lead to a malicious encryption.

If the user space library 302 detects a change to the assembly instructions mapping at the cache level, it can request the instruction detector to check the mapped assembly instructions at 316. At 318, the instruction detector 304 can transmit a message to configure the kernel image 306 for the collection of metrics. The kernel image can be a binary form of an operating system. For example, the instruction detector 304 can configure a central processing unit (CPU), a graphical processing unit (GPU), for collection of metrics at the hardware-level.

At 320, the instruction detector 304 can register a call back function to provide a callback to the user space library 302 in the event that one or more of the collected metrics exceed a threshold. The call back can be executable code that passed as an argument into another piece of code. The callback can further provide a message to a higher-level function (e.g., user space library) to perform certain postprocessing of the collected metrics.

At 322, the kernel image 306 can return hardware metrics to the instruction detector 304. The hardware metrics can be retrieved from multiple hardware related sources. The hardware metrics can be continuously received by the instruction detector 304 and from the kernel image 306. The instructor detector 304 can continuously compare the hardware metrics to one or more threshold values. The threshold values can be related to key performance indicators (KPIs). The instruction detector 304 can perform the comparison to identify an instruction in cache that is related to ransomware.

At 324, the instruction detector 304 can send a notification to the user space library 302 that an instruction may be an issue. For example, the assembly instruction can be related to malicious encryption instructions. The notification can be included in the above-referenced callback. In response to receiving the notification, the user space library 302 can begin post-processing for recording the incident. For example, the user space library 302 can begin updating Key Performance Indicators (KPIs), updating hardware device footprints, identifying which memory maps are updated, identify any generated artifacts. The user space library 302 can further timestamp the collected data and store it in a bucket.

At 326, the instruction detector 304 can transmit a notification to a logging service 308, that a metric exceeded a threshold. The instruction detector 304 can further indicate that the user space library 302 was triggered to perform post-processing of collected data related to a potential ransomware incident at the hardware level. In other instances, the instruction detector 304 can transmit a notification of a failure. This suggests that the user space library 302 transmitted a request to check specific assembly instructions, the instruction detector began to collect metrics, but that the threshold was not exceeded.

At 328, the user space library 302 can transmit a notification to the instruction detector 304 as to whether the memory was wiped. As illustrated in FIG. 2, the system 100 permits repaving an instance compromised by ransomware. The repaving can include returning an instance from a compromised state to a prior state. For example, the repaver 200 can reload an image of the instance, where the reloaded image is at a state prior to a ransomware attack. The status can be that the instance has not been repaved, is in the process of repaving, or has been repaved.

As described above, cache instructions can be identified at the microprocessor level and may be the result of ransomware. In some embodiments, assembly instructions are identified at a cache level that may be related to ransomware. The identified instructions can be compared with certain KPIs to determine whether the instructions are related to ransomware. A mathematical formula using a weighted average can be implemented to dynamically distinguish between legitimate and malicious encryption instructions. Each instruction can be weighted as to a likelihood that the instructions are related to a ransomware attack. An example table below provides, a description of each instruction, and a weight for each instruction.

| Instruction | Description | Weight of each |
|---|---|---|
| AESENC | Perform one round of an AES encryption flow | 0.25 |
| AESENCLAST | Perform the last round of an AES encryption flow | 0.25 |
| AESDEC | Perform one round of an AES decryption flow | 0.25 |
| AESDECLAST | Perform the last round of an AES decryption flow | 0.25 |
| AESKEYGENASSIST | Assist in AES round key generation | 0.1 |
| AESIMC | Assist in AES | 0.1 |

Each of the identified instructions relates to a bucket of an encryption/decryption instruction type. A description of the instruction class is provided, and a weight for an instruction type is also provided. The weight can be an indication that if an instruction class is identified in a cache, there is the likelihood that the instruction is related to ransomware. It should be appreciated that the above table is for illustration purposes only, and the instruction classes, descriptions, and weights can be any situation specific instructions. For example, a processor can have one architecture and use one set of instruction classes, and another processor with a different architecture and use another set of instruction classes.

In some embodiments, the user space library can implement a function that applies the following formula to identify instructions as related to ransomware: The total weight=sum of (frequency of each instruction class*weight each instruction class) (e.g., total weight=[((frequency of first instruction class)(weight of first instruction class))+ ((frequency of second instruction class)(weight of second instruction class))]. As described above, a cache can be monitored over a configurable time window. During the time window, each instruction type can be logged. The user space library can then aggregate instructions based on an instruction type and frequency of a particular instruction. The user space library can multiply the frequency of instruction based on the instruction type to calculate a total weight. The total weight can be compared to a KPI to determine whether the presence of the instructions indicates a ransomware attack.

As described above, detection instructions relating to encryption/decryption in a memory set can be aggregated to determine whether a ransomware attack is present. Responsive to identifying that a ransomware attack is likely present, a trigger can be created to initiate repaving to migrate resources from the victim computing instances In some embodiments, a user space library can create a table for a hardware that is a potential victim of a ransomware attack. The user space library can populate the table with hardware related metadata. The metadata can be various values that are configured into a kernel image from the hardware. The metadata is configured into a known pattern and compared to known values, such a ground truth values. The user space library can traverse the table and compare metadata to the known whiles. For example, the process can be configured as a "while" loop, in which the middle continues to perform the comparison until no metadata is compared to known values.

A memory set can be obtained that includes the identified instruction instances in the memory rows. The memory set can be processed using a ransomware detection structure to detect ransomware-related instructions and to determine whether instructions comprise transitory encryption or include sustained encryption that likely comprises a ransomware attack. Each memory row can be accessed according to a specific order. For example, contents in a first row can be read and saved with a prior row and a subsequent row. After reading/writing into the chunk of rows, a previous row and another subsequent row can be read according to the order.

Responsive to not detecting any instructions relating to encryption, a result can indicate no encryption was detected. Alternatively, if instructions to encrypt data are detected, a change in memory contents for each chunk of memory rows can be calculated. The results can be compared with a threshold to determine whether the instructions exceed a threshold amount. Further, the results can be processed to determine whether the instructions comprise a false positive. Responsive to the results being verified, which is indicative of a ransomware attack likely occurring, a trigger can be created for cloud repaving of the victim computing instances.

In some instances, instructions to encrypt and decrypt data can be analyzed to validate results and remove false positive instances of identified likely ransomware attacks via cryptographic bitmap. As described above, the user space library can observe the cache over a configurable time window. For example, the user space library can observe data be written into and read out of a cache over a three second time window. The user space library can further retrieve historical data from the cache over a similar time window. The historical data, assuming no malicious encryption was observed at the time, serve as a benchmark for current data. The user space library can compare the two datasets and determine if a difference (e.g., a delta) between the two data sets suggests that malicious encryption has occurred.

In some embodiments, a cryptographic bitmap can be generated to include a bitmap of instructions identified for each memory row. A mathematical exclusive or (XOR) operation can be performed for bitmaps for adjacent memory rows. A delta value can be derived as a result of the XOR operation for each set of adjacent bitmaps, and a summation of the delta values can be derived by aggregating the delta values. If the total sum of summated delta values exceeds a threshold, encryption/decryption can be identified. Alternatively, the system can continue accumulating instructions identified in the memory set. In some instances, a data analytic function, such as a min, max, standard, deviation can be used to arrive at possible threshold variants.

Figure 4:
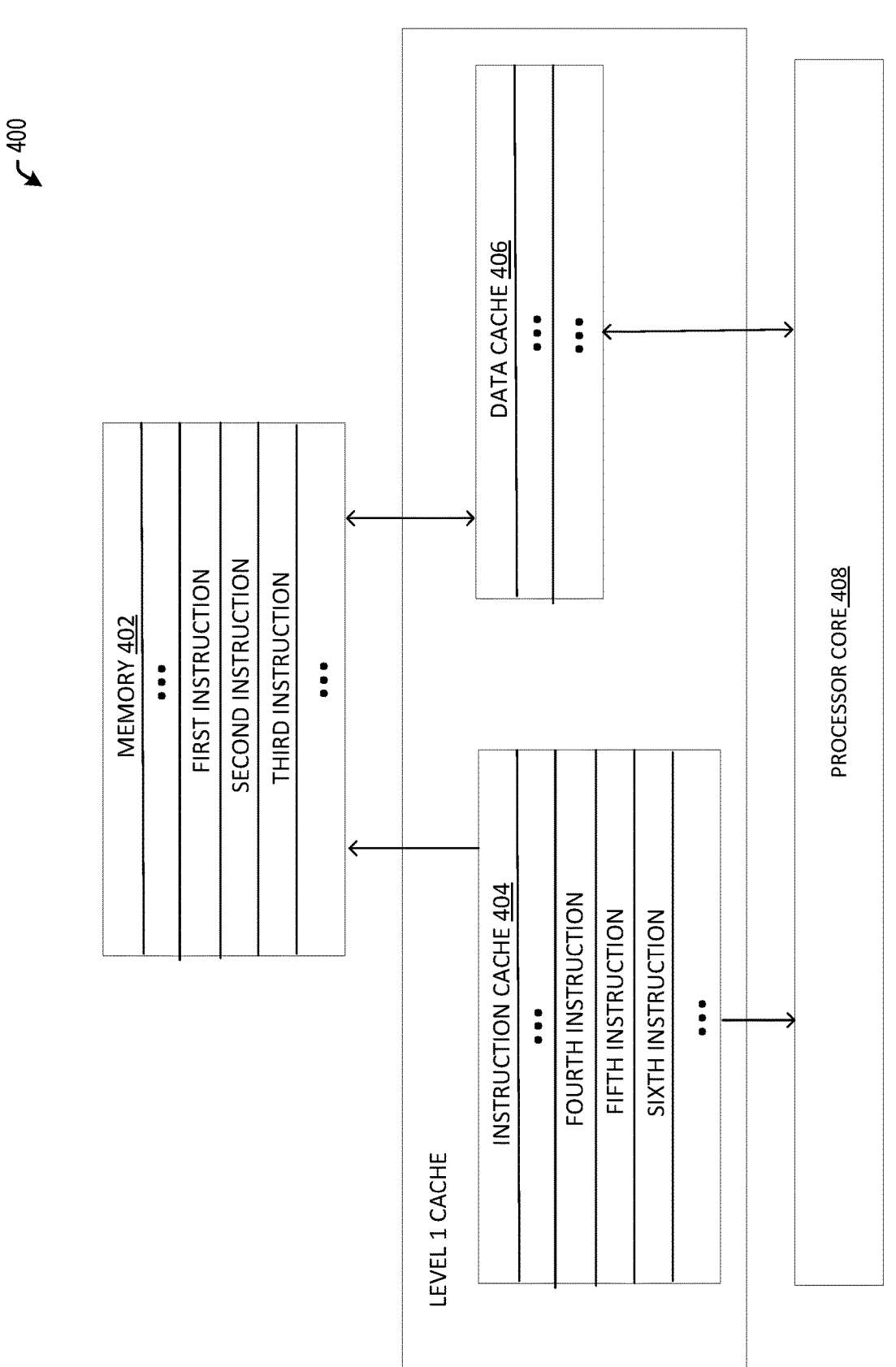
FIG. 4 is a block diagram of an example memory system, according to at least one embodiment.

Referring to FIG. 4, an example instruction cache system 400 is shown, according to one or more embodiments. As illustrated a memory 402 can provide instructions to an instruction cache 404 and data to a data cache 406. A processor core 408 can receive instructions from the instruction cache 404 and data for using during execution of the instructions from the data cache 406. The processor core 408 can return modified or unmodified data back to the data cache 406, and the data cache 406 can return the data to the memory 402. As the processor core 408 is ready to execute a next instruction, it retrieves the next instruction from the instruction cache 404. As new instructions are required, a new instruction can be written into the instruction cache 404 from the memory 402. This is a continuous process, and therefore the instructions that are currently in the instruction cache 404 can be different based on a time that the instruction cache is observed. As described above, each of the instructions in the instructions cache 404 at any given time can belong to a respective instruction class, and can be assigned a weight based on the class. Furthermore, each instruction can be an instruction for malicious encryption.

As described above, instruction cache 404 can be observed over a configurable window. This includes the instructions that are being read from the memory 402 and written in the instruction cache. This also includes the instructions currently stored in the instruction cache 404, and the instructions that are read by the processor core 408 for execution. As a state of the instruction cache 404 is a function of time, the herein described embodiments include configurable time window for observing the instruction cache 404. Therefore, the system 100 can configure a time associated with a window for observation of the instruction cache. For example, if the window is configured to X milliseconds (ms), and the system 100 can observe the instruction cache for X ms. If, however, the system 100 configures the window to be Y ms, the system 100 can observe the instruction cache for Y ms. The system 100 can configure the window based on an optimal window to identify whether malicious instructions are being received at the instruction cache 404.

Figure 5:
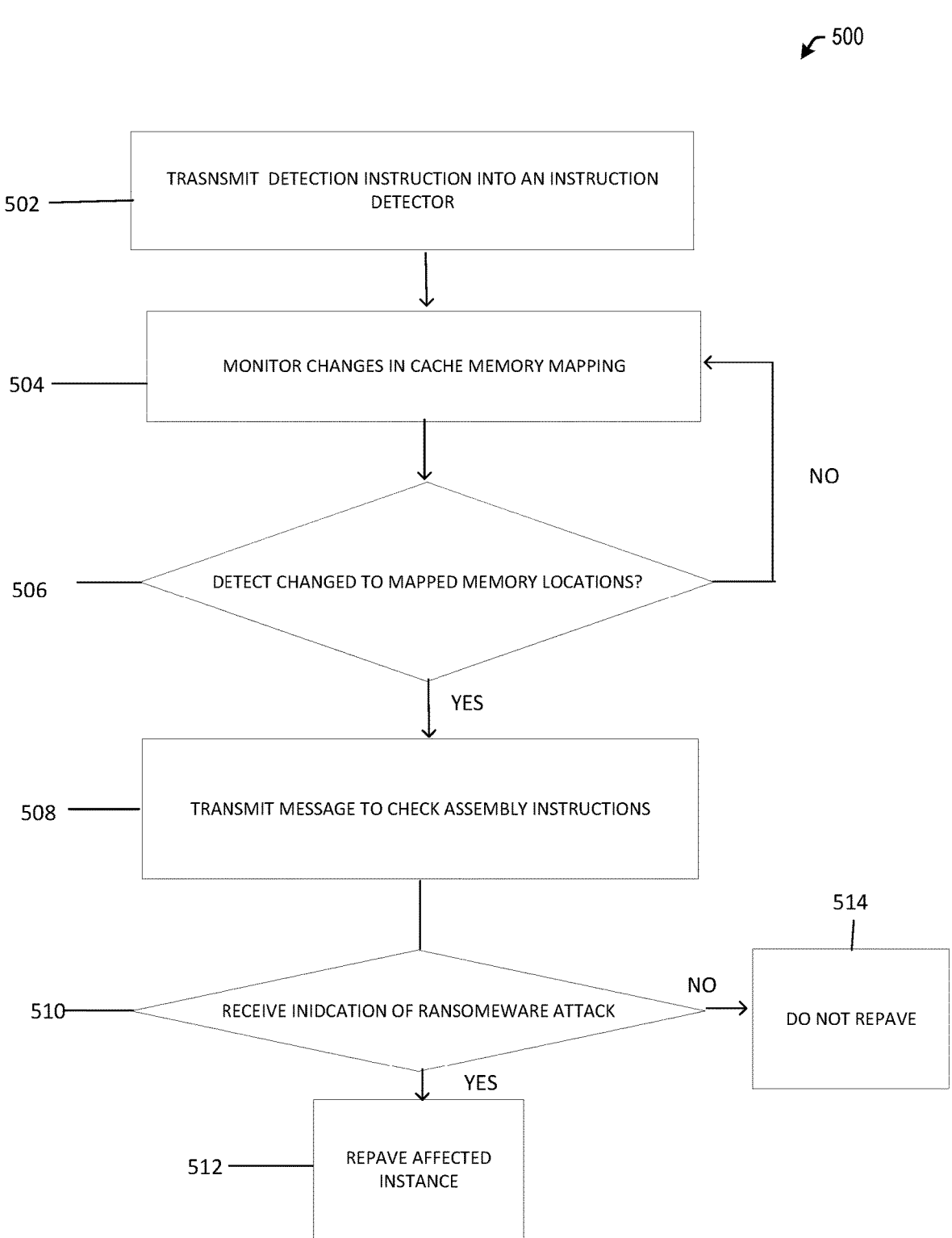
FIG. 5 is a block diagram of an example process for ransomware detection, according to at least one embodiment.

FIG. 5 illustrates a process 500 for identifying a ransomware attack, according to some embodiments. At 502, a computing device can transmit detection instructions into an instruction detector. The computing device can include, for example, a node of a cloud infrastructure system. The node can include a user space library that manages communication between an application and cloud infrastructure device. The computing device can transmit the detection instructions in response to detecting an interaction between the application and the cloud infrastructure device.

At 504, the computing device can monitor a cache, such as an instruction cache to detect changes in a memory mapping. The memory mapping can be a mapping from instructions written into the instruction cache and a memory that the instructions are read from. The instructions can be assembly level instructions for hardware. The computing device can monitor the cache over a configurable window.

At 506, the computing device can determine whether it detects any changes to the memory mapping. If, there are no detected changes to the memory mapping, the process 500 returns to 504, at which point the continuing device continues to monitor the cache. If, however, the computing device detects a change to the memory mapping, the process 500 proceeds to 508.

At 508, the computing device can transmit a message to check instructions. The message can be transmitted to an instruction detector, and the instructions to be checked can be the instructions related to the change in the memory mapping. For example, if the memory mapping initially indicated that the cache was set to retrieve instructions from one location in memory, and then the mapping is changed to have instructions retrieved from another location, the computing device can request to check those instructions.

At 510, the computing device can receive a message of whether there has been a ransomware attack. The message can be received as a callback and from an instruction detector. If the message suggests a ransomware attack, the computing device can repave an affected instance at 512. If, however, the message does not suggest a ransomware attack, the computing device does not repave the instance at 514.

Figure 6:
FIG. 6 is a block diagram of an example process for ransomware detection, according to at least one embodiment.
Figure 6:
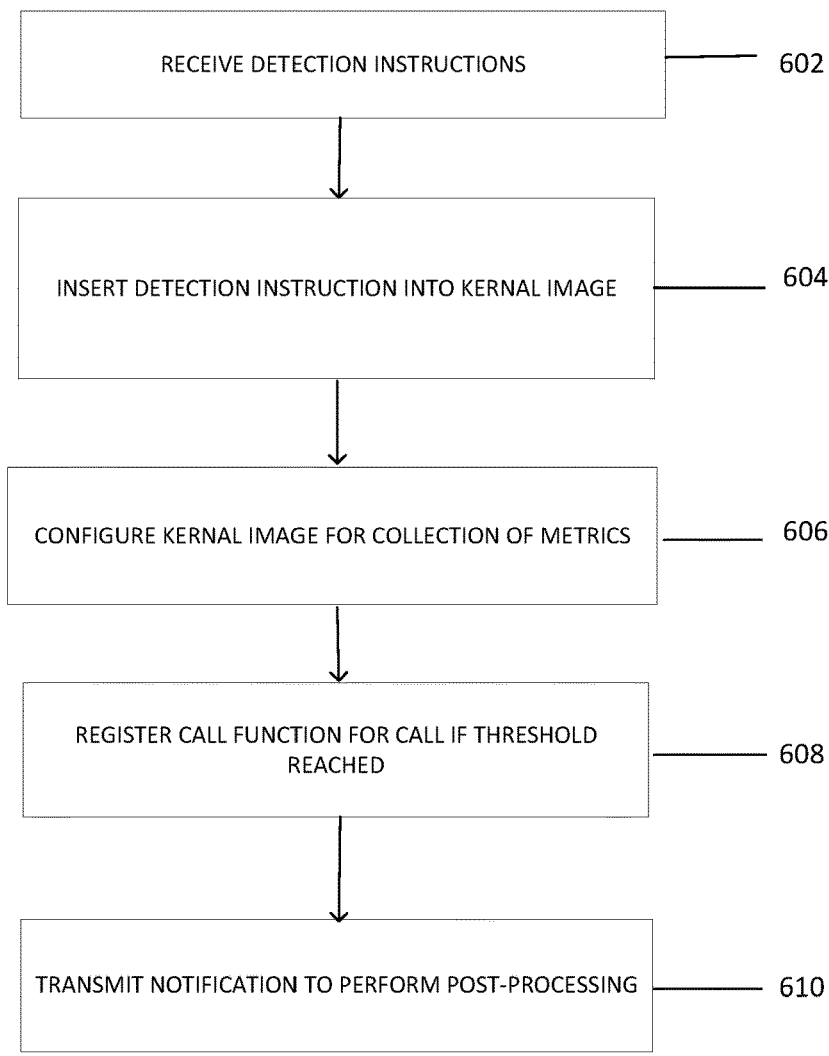

FIG. 6 illustrates a process 600 for identifying a ransomware attack, according to some embodiments. At 602, a computing device can receive detection instructions. The computing device can be a node of a cloud infrastructure system. The node can further include an instruction detector. The detection instructions can include a kernel driver. At 604, the computing device can transmit the detection instructions into a kernel image. The kernel image can include an operating system of a cloud computing infrastructure (e.g., for a non-Linux-based system). The detection instructions can be used to configure the kernel image for collection of metrics related to detection of a ransomware attack.

At 606, the computing device can register a callback function in case a threshold is reached. The callback function can be configured to send a message to a user space library that a threshold has been exceeded. The message can further be a message to the user space library to begin post-processing steps.

At 608, the computing device can compare collected metrics to thresholds. The metrics can be collected by a kernel image (or an operating system of non-Linux-based system). The threshold can be based on configurable KPIs provided to the computing device.

At 610, the computing device can transmit a notification to the user space library. The notification can be based on the callback function. The notification can include a message that a ransomware attack has occurred, or the notification can be a message that no ransomware attack has occurred. Prior to sending the notification, the computing device can determine whether a message of a ransomware attack is a false positive. For example, if the collected metrics exceed one or more thresholds and after analyzing for false positives, the computing device can transmit a message that a ransomware attack has been detected. If, however, the collected metrics do not exceed any threshold, the computing device can transmit a message that no ransomware attack has been detected.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing, and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may first need to be set up. In some instances, the provisioning can be done manually, a provisioning tool may be utilized to provision the resources, and/or deployment tools may be utilized to deploy the code once the infrastructure is provisioned.

Figure 7:
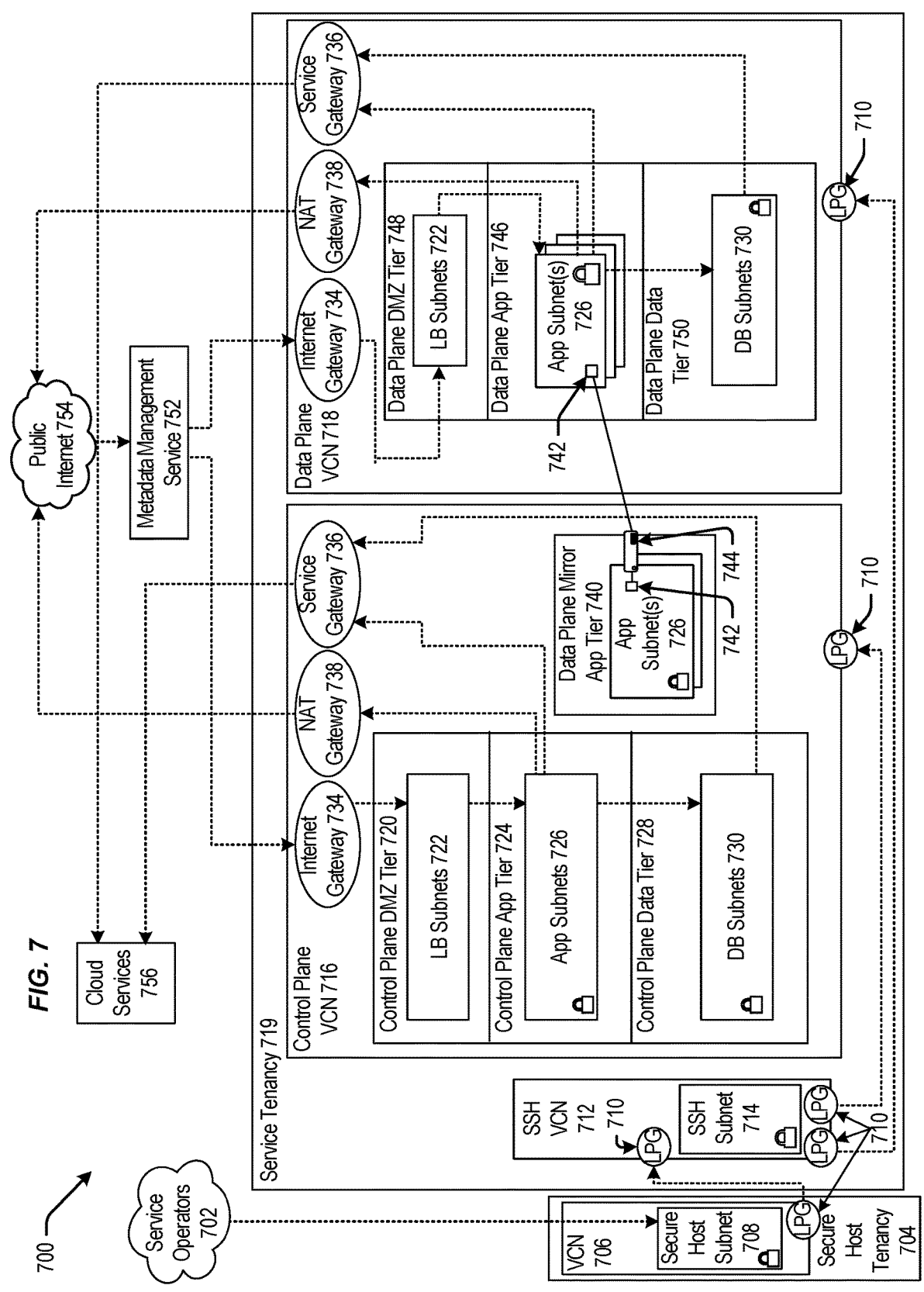
FIG. 7 is a block diagram illustrating a pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 14, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively coupled to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. A memory that may be desired to store the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
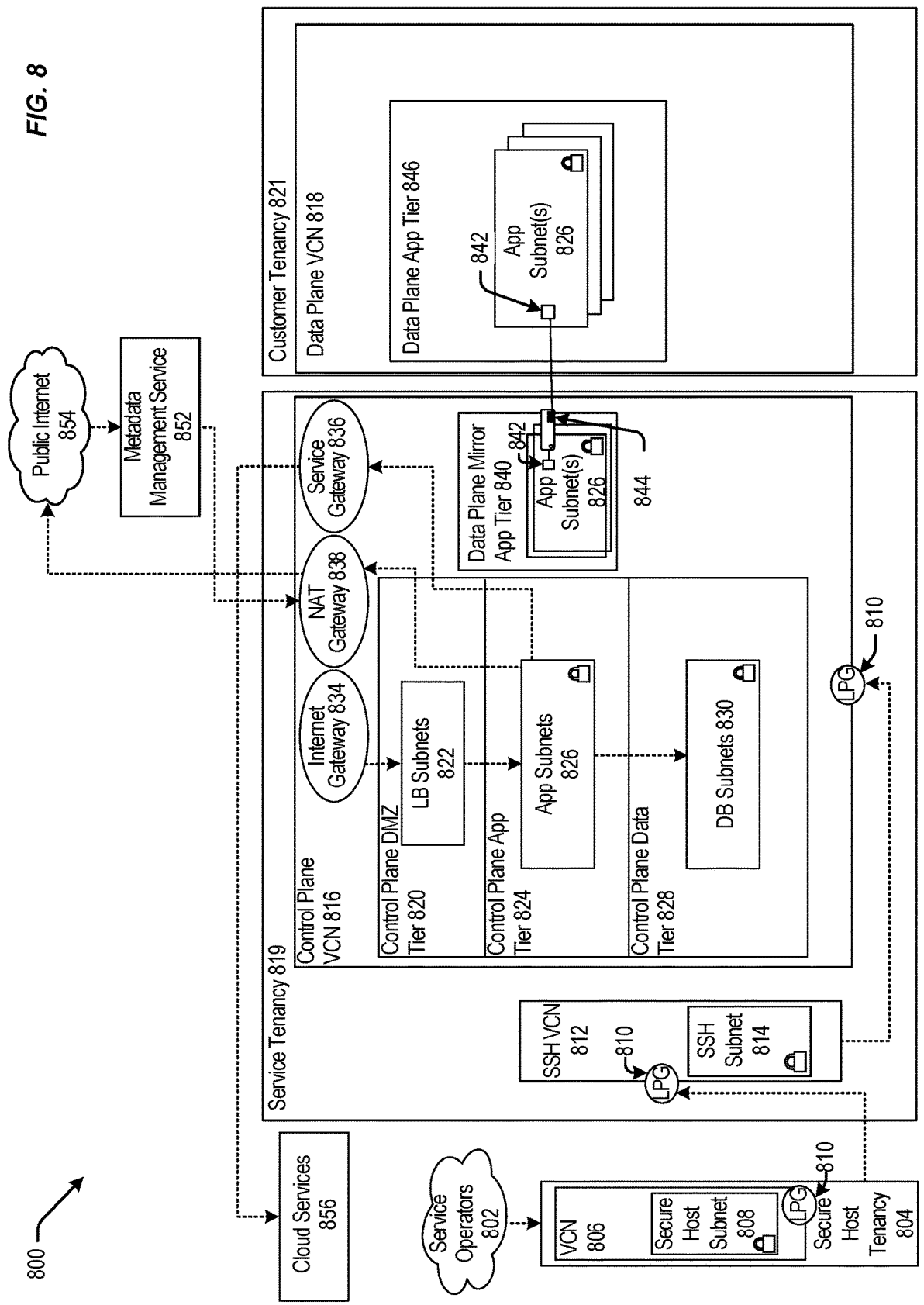
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 702 of FIG. 7) can be communicatively coupled to a secure host tenancy 804 (e.g., the secure host tenancy 704 of FIG. 7) that can include a virtual cloud network (VCN) 806 (e.g., the VCN 706 of FIG. 7) and a secure host subnet 808 (e.g., the secure host subnet 708 of FIG. 7). The VCN 876 can include a local peering gateway (LPG) 810 (e.g., the LPG 710 of FIG. 7) that can be communicatively coupled to a secure shell (SSH) VCN 812 (e.g., the SSH VCN 712 of FIG. 7) via an LPG 810 contained in the SSH VCN 812. The SSH VCN 812 can include an SSH subnet 814 (e.g., the SSH subnet 714 of FIG. 7), and the SSH VCN 812 can be communicatively coupled to a control plane VCN 816 (e.g., the control plane VCN 716 of FIG. 7) via an LPG 810 contained in the control plane VCN 816. The control plane VCN 816 can be contained in a service tenancy 819 (e.g., the service tenancy 719 of FIG. 7), and the data plane VCN 818 (e.g., the data plane VCN 718 of FIG. 7) can be contained in a customer tenancy 821 that may be owned or operated by users, or customers, of the system.

The control plane VCN 816 can include a control plane DMZ tier 820 (e.g., the control plane DMZ tier 720 of FIG. 7) that can include LB subnet(s) 822 (e.g., LB subnet(s) 722 of FIG. 7), a control plane app tier 824 (e.g., the control plane app tier 724 of FIG. 7) that can include app subnet(s) 826 (e.g., app subnet(s) 726 of FIG. 7), a control plane data tier 828 (e.g., the control plane data tier 728 of FIG. 7) that can include database (DB) subnet(s) 830 (e.g., similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g., the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g., the service gateway 736 of FIG. 7) and a network address translation (NAT) gateway 838 (e.g., the NAT gateway 738 of FIG. 7). The control plane VCN 816 can include the service gateway 836 and the NAT gateway 838.

The control plane VCN 816 can include a data plane mirror app tier 840 (e.g., the data plane mirror app tier 740 of FIG. 7) that can include app subnet(s) 826. The app subnet(s) 826 contained in the data plane mirror app tier 840 can include a virtual network interface controller (VNIC) 842 (e.g., the VNIC of 742 of FIG. 7) that can execute a compute instance 844 (e.g., similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g., the data plane app tier 846 of FIG. 8) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g., the metadata management service 702 of FIG. 7) that can be communicatively coupled to public Internet 854 (e.g., public Internet 704 of FIG. 7). Public Internet 854 can be communicatively coupled to the NAT gateway 838 contained in the control plane VCN 816. The service gateway 836 contained in the control plane VCN 816 can be communicatively coupled to cloud services 856 (e.g., cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 1," may be located in Region 1 and in "Region 2." If a call to Deployment 1 is made by the service gateway 836 contained in the control plane VCN 816 located in Region 1, the call may be transmitted to Deployment 1 in Region 1. In this example, the control plane VCN 816, or Deployment 1 in Region 1, may not be communicatively coupled to, or otherwise in communication with, Deployment 2 in Region 2.

Figure 9:
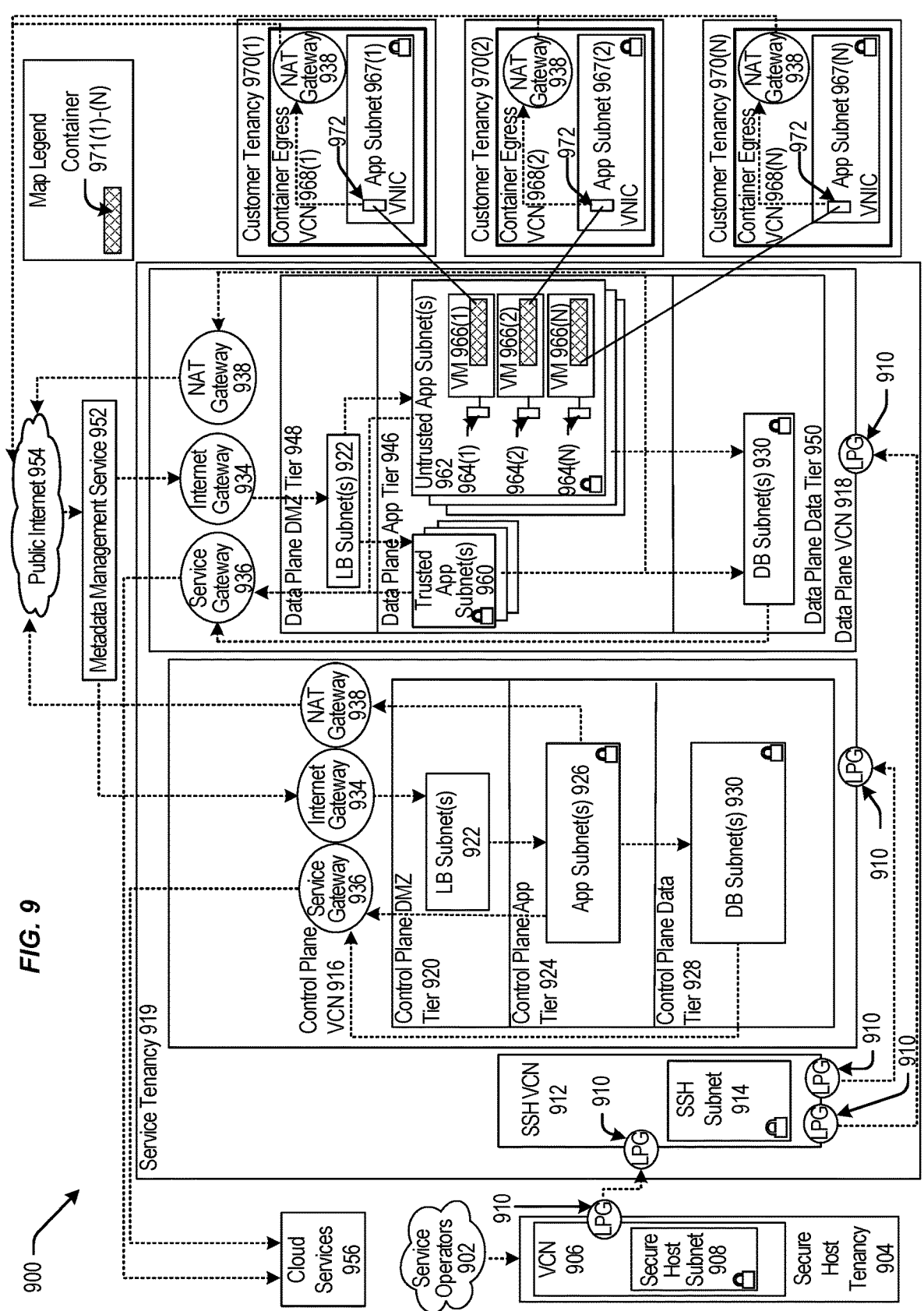
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 702 of FIG. 7) can be communicatively coupled to a secure host tenancy 904 (e.g., the secure host tenancy 704 of FIG. 7) that can include a virtual cloud network (VCN) 906 (e.g., the VCN 906 of FIG. 7) and a secure host subnet 908 (e.g., the secure host subnet 708 of FIG. 7). The VCN 906 can include an LPG 910 (e.g., the LPG 710 of FIG. 7) that can be communicatively coupled to an SSH VCN 912 (e.g., the SSH VCN 712 of FIG. 7) via an LPG 910 contained in the SSH VCN 912. The SSH VCN 912 can include an SSH subnet 914 (e.g., the SSH subnet 714 of FIG. 7), and the SSH VCN 912 can be communicatively coupled to a control plane VCN 916 (e.g., the control plane VCN 716 of FIG. 7) via an LPG 910 contained in the control plane VCN 916 and to a data plane VCN 918 (e.g., the data plane 718 of FIG. 7) via an LPG 910 contained in the data plane VCN 918. The control plane VCN 916 and the data plane VCN 918 can be contained in a service tenancy 919 (e.g., the service tenancy 719 of FIG. 7).

The control plane VCN 916 can include a control plane DMZ tier 920 (e.g., the control plane DMZ tier 720 of FIG. 7) that can include load balancer (LB) subnet(s) 922 (e.g., LB subnet(s) 722 of FIG. 7), a control plane app tier 924 (e.g., the control plane app tier 724 of FIG. 7) that can include app subnet(s) 926 (e.g., similar to app subnet(s) 726 of FIG. 7), a control plane data tier 928 (e.g., the control plane data tier 728 of FIG. 7) that can include DB subnet(s)

930. The LB subnet(s) 922 contained in the control plane DMZ tier 920 can be communicatively coupled to the app subnet(s) 926 contained in the control plane app tier 924 and to an Internet gateway 934 (e.g., the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g., the service gateway 736 of FIG. 7) and a network address translation (NAT) gateway 938 (e.g., the NAT gateway 738 of FIG. 7). The control plane VCN 916 can include the service gateway 936 and the NAT gateway 938.

The data plane VCN 918 can include a data plane app tier 946 (e.g., the data plane app tier 746 of FIG. 7), a data plane DMZ tier 948 (e.g., the data plane DMZ tier 748 of FIG. 7), and a data plane data tier 950 (e.g., the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g., public Internet 754 of FIG. 7). The Internet gateway 934 contained in the control plane VCN 916 and contained in the data plane VCN 918 can be communicatively coupled to a metadata management service 952 (e.g., the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively coupled to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
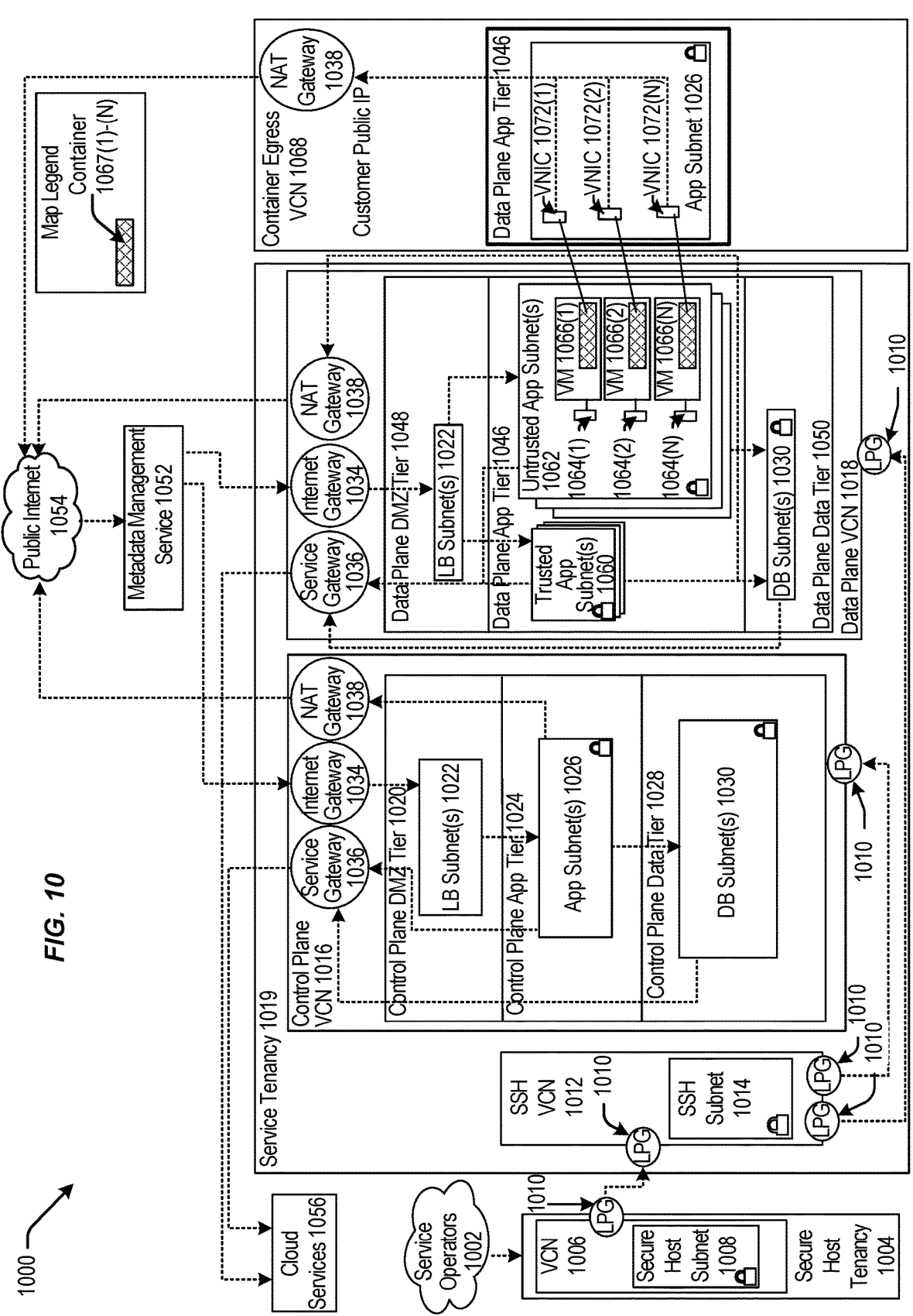
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 702 of FIG. 7) can be communicatively coupled to a secure host tenancy 1004 (e.g., the secure host tenancy 704 of FIG. 7) that can include a virtual cloud network (VCN) 1006 (e.g., the VCN 706 of FIG. 7) and a secure host subnet 1008 (e.g., the secure host subnet 708 of FIG. 7). The VCN 1006 can include an LPG 1010 (e.g., the LPG 710 of FIG. 7) that can be communicatively coupled to an SSH VCN 1012 (e.g., the SSH VCN 712 of FIG. 7) via an LPG 1010 contained in the SSH VCN 1012. The SSH VCN 1012 can include an SSH subnet 1014 (e.g., the SSH subnet 714 of FIG. 7), and the SSH VCN 1012 can be communicatively coupled to a control plane VCN 1016 (e.g., the control plane VCN 716 of FIG. 7) via an LPG 1010 contained in the control plane VCN 1016 and to a data plane VCN 1018 (e.g., the data plane 718 of FIG. 7) via an LPG 1010 contained in the data plane VCN 1018. The control plane VCN 1016 and the data plane VCN 1018 can be contained in a service tenancy 1019 (e.g., the service tenancy 719 of FIG. 7).

The control plane VCN 1016 can include a control plane DMZ tier 1020 (e.g., the control plane DMZ tier 720 of FIG. 7) that can include LB subnet(s) 1022 (e.g., LB subnet(s) 722 of FIG. 7), a control plane app tier 1024 (e.g., the control plane app tier 724 of FIG. 7) that can include app subnet(s) 1026 (e.g., app subnet(s) 726 of FIG. 7), a control plane data tier 1028 (e.g., the control plane data tier 728 of FIG. 7) that can include DB subnet(s) 1030 (e.g., DB subnet(s) 730 of FIG. 7). The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g., the service gateway 736 of FIG. 7) and a network address translation (NAT) gateway 1038 (e.g., the NAT gateway 738 of FIG. 7). The control plane VCN 1016 can include the service gateway 1036 and the NAT gateway 1038.

The data plane VCN 1018 can include a data plane app tier 1046 (e.g., the data plane app tier 746 of FIG. 7), a data plane DMZ tier 1048 (e.g., the data plane DMZ tier 748 of FIG. 7), and a data plane data tier 1050 (e.g., the data plane data tier 750 of FIG. 7). The data plane DMZ tier 1048 can include LB subnet(s) 1022 that can be communicatively coupled to trusted app subnet(s) 1060 (e.g., trusted app subnet(s) 960 of FIG. 9) and untrusted app subnet(s) 1062 (e.g., untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g., public Internet 754 of FIG. 7).

The Internet gateway 1034 contained in the control plane VCN 1016 and contained in the data plane VCN 1018 can be communicatively coupled to a metadata management service 1052 (e.g., the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively coupled to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N), that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
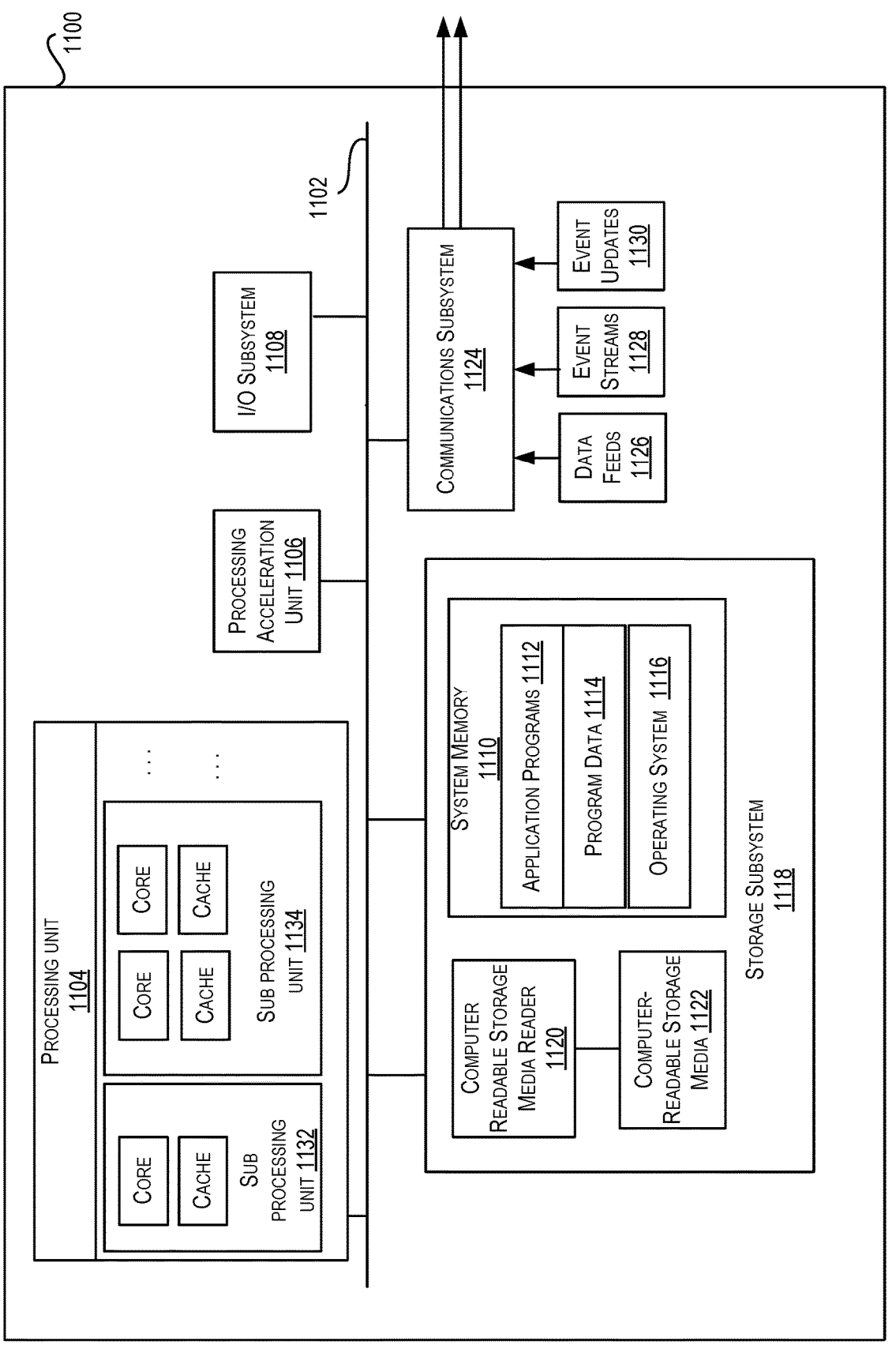
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present disclosure.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer-readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 302.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
   during hardware-based execution of at least one instruction in a set of instructions in an instruction cache accessible by a hardware processor, executing a monitoring operation to monitor the instruction cache;
   detecting a modification of a mapping of a first memory location to a cache location within the instruction cache;
   based at least on detecting the modification of the mapping, triggering a validation operation for validating one or more instructions of the set of instructions in the instruction cache;
   causing execution of the validation operation for validating the one or more instructions of the set of instructions in the instruction cache, wherein executing the validation operation comprises:
      collecting a metric associated with the one or more instructions of the set of instructions in the instruction cache; and
      determining a likelihood of a ransomware attack based on the metric; and
   transmitting a first notification based on the likelihood of the ransomware attack.

2. The computer-implemented method of claim 1, wherein the method further comprises:
   detecting an instruction class of a first instruction stored in the instruction cache;
   determining a frequency of instances of the first instruction in the instruction cache;
   assigning a weight to the first instruction based at least in part on the instruction class; and
   determining the likelihood of the ransomware attack based at least in part on the weight.

3. The computer-implemented method of claim 1, wherein the method further comprises:
   generating a first cryptographic bitmap comprising a first row of encryption related data associated with the instruction cache, and generating a second cryptographic bitmap comprising a second row of encryption related data associated with the instruction cache, wherein the first row is associated with a first instruction of the one or more instructions;
   performing, on the first row and the second row, a mathematical exclusive operation to derive a delta value;
   comparing derived delta value to a threshold delta value; and determining whether the likelihood of the ransomware attack is a false positive based on the comparing.

4. The computer-implemented method of claim 1, wherein the method further comprises registering a callback function, and wherein the first notification is transmitted using the callback function.

5. The computer-implemented method of claim 1, wherein the method further comprises receiving a second notification that an instance has been repaved based at least in part on the determination of the likelihood of the ransomware attack.

6. The method of claim 1, wherein the operations further comprise:

determining that modifications to the mapping exceed a threshold number of modifications, wherein executing the validation instruction is responsive to determining that the modifications to the mapping exceed a threshold number of modifications.

7. The method of claim 1, wherein:

the one or more instructions comprise assembly instructions related to encryption; and determining the likelihood of the ransomware attack based on the metric comprises determining that one or more of the assembly instructions exceed a threshold.

8. The method of claim 1, wherein determining the likelihood of the ransomware attack based on the metric comprises:

assigning each instruction of the one or more instructions to one of a plurality of instruction classes based on a respective instruction type of the one or more instructions;

determining a weighted frequency of each instruction class using weights respectively associated with the plurality of instruction classes; and determining the likelihood of the ransomware attack based on a sum of the weighted frequencies exceeding a threshold.

9. The method of claim 1, wherein the modification of the mapping of the instruction cache location, within the instruction cache, to the first memory location is performed prior to executing the operation stored at the first memory location.

10. The computer-implemented method of claim 1, wherein:

the metric is indicative of encryption instruction types; and determining the likelihood of a ransomware attack comprises:

determining, based on the metric, a first frequency of instances of a first encryption instruction type included in the one or more instructions in the instruction cache;

assigning a first weight to the first frequency of instances based on the first encryption instruction type;

determining, based on the metric, a second frequency of instances of a second encryption instruction type included in the one or more instructions in the instruction cache;

assigning a second weight to the second frequency of instances based on the second encryption instruction type; and determining the likelihood of the ransomware attack based at least in part on (a) a combination of the first weight and the first frequency, and (b) a combination of the second weight and the second frequency.

11. A cloud infrastructure node, comprising:
a processor; and
a computer-readable medium including instructions that, when executed by the processor, cause the processor to:

during hardware-based execution of at least one instruction in a set of instructions in an instruction cache accessible by a hardware processor, execute a monitoring operation to monitor the instruction cache;

detect a modification of a mapping of a first memory location to a cache location within the instruction cache;

based at least on detecting the modification of the mapping, trigger a validation operation for validating one or more instructions of the set of instructions in the instruction cache;

cause execution of the validation operation for validating the one or more of the set of instructions in the instruction cache, wherein executing the validation operation comprises:

collecting a metric associated with the one or more instructions of the set of instructions in the instruction cache; and determining a likelihood of a ransomware attack based at least in part on the metric; and transmit a first notification of the likelihood of the ransomware attack.

12. The cloud infrastructure node of claim 11, wherein the instructions included in the computer-readable medium further cause the processor to:

detect an instruction class of a first instruction stored in the instruction cache;

determine a frequency of instances of the first instruction in the instruction cache;

assign a weight to the first instruction based at least in part on the instruction class; and determine the likelihood of the ransomware attack based at least in part on the weight.

13. The cloud infrastructure node of claim 11, wherein the instructions included in the computer-readable medium further cause the processor to:

generate a first cryptographic bitmap comprising a first row of encryption related data associated with the instruction cache, and generating a second cryptographic bitmap comprising a second row of encryption related data associated with the instruction cache, wherein the first row is associated with a first instruction of the one or more instructions;

perform, on the first row and the second row, a mathematical exclusive operation to derive a delta value;

compare derived delta value to a threshold delta value; and determine whether the likelihood of the ransomware attack is a false positive based on the comparing.

14. The cloud infrastructure node of claim 11, wherein the instructions included in the computer-readable medium further cause the processor to register a callback function, and wherein the first notification is transmitted using the callback function.

15. The cloud infrastructure node of claim 11, wherein the instructions included in the computer-readable medium further cause the processor to receive a second notification that an instance has been repaved based at least in part on the determination of the likelihood of the ransomware attack.

16. The cloud infrastructure node of claim 11, wherein the operations further comprise:

determining that modifications to the mapping exceed a threshold number of modifications, wherein executing the validation instruction is responsive to determining that the modifications to the mapping exceed a threshold number of modifications.

17. The cloud infrastructure node of claim 11, wherein:

the one or more instructions comprise assembly instructions related to encryption; and determining the likelihood of the ransomware attack based on the metric comprises determining that one or more of the assembly instructions exceed a threshold.

18. The cloud infrastructure node of claim 11, wherein determining the likelihood of the ransomware attack based on the metric comprises:

assigning each instruction of the one or more instructions to one of a plurality of instruction classes based on a respective instruction type of the one or more instructions;

determining a weighted frequency of each instruction class using weights respectively associated with the plurality of instruction classes; and determining the likelihood of the ransomware attack based on a sum of the weighted frequencies exceeding a threshold.

19. The cloud infrastructure node of claim 11, wherein the modification of the mapping of the instruction cache location, within the instruction cache, to the first memory location is performed prior to executing the operation stored at the first memory location.

20. A non-transitory computer-readable medium including stored thereon a sequence of instructions that, when executed by a processor of a cloud infrastructure node, causes the processor to perform operations comprising:

during hardware-based execution of at least one instruction in a set of instructions in an instruction cache accessible by a hardware processor, executing a monitoring operation to monitor the instruction cache;

detecting a modification of a mapping of a first memory location to a cache location within the instruction cache;

based at least on detecting the modification of the mapping, triggering a validation operation for validating one or more instructions of the set of instructions in the instruction cache;

causing execution of the validation operation for validating the one or more instructions of the set of instructions in the instruction cache, wherein executing the validation operation comprises:

collecting a metric associated with the one or more instructions of the set of instructions in the instruction cache; and determining a likelihood of a ransomware attack based on the metric; and transmitting a notification based on the likelihood of the ransomware attack.

21. The non-transitory computer-readable medium of claim 20, wherein the operations further comprise:

detecting an instruction class of a first instruction stored in the instruction cache;

determining a frequency of instances of the first instruction in the instruction cache;

assigning a weight to the first instruction based at least in part on the class; and determining the likelihood of the ransomware attack based at least in part on the weight.

22. The non-transitory computer-readable medium of claim 20, wherein the operations further comprise:

generating a first cryptographic bitmap comprising a first row of encryption related data associated with the instruction cache, and generating a second cryptographic bitmap comprising a second row of encryption related data associated with the instruction cache, wherein the first row is associated with a first instruction of the one or more instructions;

performing, on the first row and the second row, a mathematical exclusive operation to derive a delta value;

comparing derived delta value to a threshold delta value; and determining whether the likelihood of the ransomware attack is a false positive based on the comparing.

23. The non-transitory computer-readable medium of claim 20, wherein the operations further comprise registering a callback function, and wherein the notification is transmitted using the callback function.

24. The non-transitory computer-readable medium of claim 20, wherein the operations further comprise:

determining that modifications to the mapping exceed a threshold number of modifications, wherein executing the validation instruction is responsive to determining that the modifications to the mapping exceed a threshold number of modifications.

25. The non-transitory computer-readable medium of claim 20, wherein:

the one or more instructions comprise assembly instructions related to encryption; and determining the likelihood of the ransomware attack based on the metric comprises determining that one or more of the assembly instructions exceed a threshold.

26. The non-transitory computer-readable medium of claim 20, wherein determining the likelihood of the ransomware attack based on the metric comprises:

assigning each instruction of the one or more instructions to one of a plurality of instruction classes based on a respective instruction type of the one or more instructions;

determining a weighted frequency of each instruction class using weights respectively associated with the plurality of instruction classes; and determining the likelihood of the ransomware attack based on a sum of the weighted frequencies exceeding a threshold.

27. The non-transitory computer-readable medium of claim 20, wherein the modification of the mapping of the instruction cache location, within the instruction cache, to the first memory location is performed prior to executing the operation stored at the first memory location.

* * * * *